United States Patent [19]
Lifshits et al.

[11] 3,723,701
[45] Mar. 27, 1973

[54] METHOD OF FLASH BUTT WELDING OF ARTICLES

[76] Inventors: Viktor Senderovich Lifshits, Kavkazsky bulvar, 21, korpus 2, kv. 41, Moscow; Viktor Ivanovich Grigoriev, poselok Lvovsky, Sadovy proezd. 4, kv. 47, Moskovskaya; Georgy Nikolaevich Petrov, Izmailovsky bulvar. 34/32, kv. 8, Moscow; Oleg Sergeevich Papkov, Samarkandsky bulvar, 24, korpus 3, kv. 3, Moscow, all of U.S.S.R.

[22] Filed: Mar. 23, 1971

[21] Appl. No.: 127,122

[52] U.S. Cl. ................................. 219/100, 219/104
[51] Int. Cl. ............................................. B23k 9/00
[58] Field of Search .219/104, 101, 107, 150, 97–100

[56] References Cited

UNITED STATES PATENTS

| 3,560,699 | 2/1971 | Draving | 219/103 |
| 3,514,574 | 5/1970 | Forschler | 219/104 |
| 2,843,724 | 7/1958 | Gaeta et al. | 219/104 X |

*Primary Examiner*—J. V. Truhe
*Assistant Examiner*—L. A. Schutzman
*Attorney*—Holman & Stern

[57] ABSTRACT

A method of flash welding of two elongated parts secured in clamps which consists in essence in that elastic energy is stored in one of the parts to be welded and in a welding machine element connecting two clamps in which said part is secured, and the energy thus stored is employed to bring together the parts to be welded during the welding procedure.

1 Claim, 6 Drawing Figures

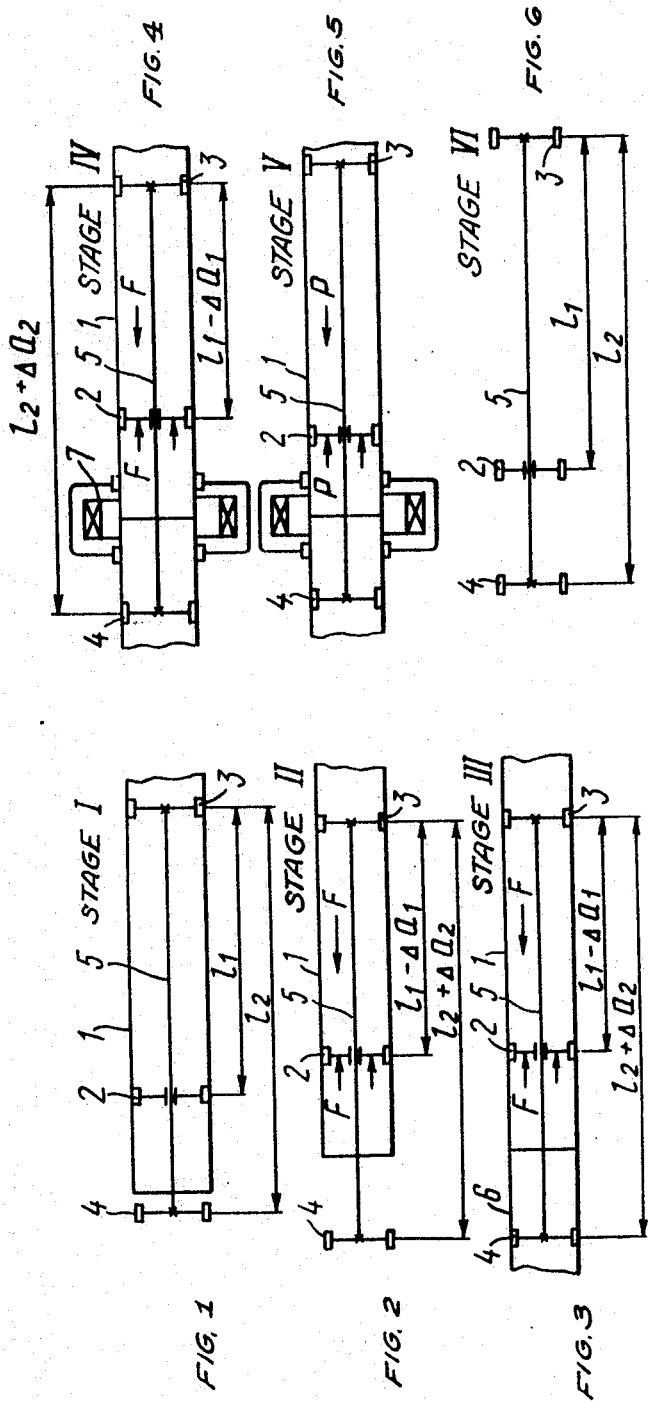

METHOD OF FLASH BUTT WELDING OF ARTICLES

The present invention relates to electrical industry and more particularly to a method of flash butt welding of articles, for the most part extended pieces, such as pipes.

Widely known is the method of flash butt welding where in the pieces to be welded are secured in a moving and stationary clamps of a butt welding machine, the welding voltage is applied to the pieces to be welded and they are brought together during flashing and upsetting with the aid of various travel gears.

Owing to its ease and reliability the above method of resistance butt welding has found wide application in engineering practice.

However, in using the foregoing method in the construction of main and oil-or-gas-field pipelines, when the welding machine is fed by a mobile power plant of a limited rating, said method has a number of disadvantages.

The most significant disadvantages consist in the need in a high-pressure and a high-duty pump to be incorporated in a welding machine in order to ensure high upset speed which requires high power input.

A further drawback of the afore-mentioned method is the reduction in an average upset speed when using the welding machine with a hydraulic system comprising a high-pressure but low-duty pump as well as various types of hydraulic accumulators which tends to increase only the initial upset speed whereas it average value does not display any improvement. In many instances it may affect adversely the quality of the resulting welded joints.

The object of the present invention is to provide a method of flash butt welding of articles which would ensure high average upset speed along with high quality of welded joints not requiring either high-duty power sources or powerful hydraulic drives.

The said and other objects achieved by the fact that while in the flash butt welding of articles provision is made to bring together the parts to be welded in the course of flashing and upsetting, in conformity to the present invention before said parts start moving to be brought together during welding, at least one of them is longitudinally compressed by using two spaced clamps whereas the welding machine element which serves to connect the clamps, gripping the above part, is stretched in the direction of the upset force to store elastic energy in the element. Further, upon abutting and clamping in the machine of the second part to be welded, the compressed part and the stretched element of the welding machine are relieved respectively from the compressive and stretching forces to bring the parts together during welding under the effect of the stored elastic energy.

In order to compress the part to be welded as well as to stretch the element, e.g., an arm, of the welding machine it is expedient, prior to welding, to secure one of the parts to be welded in two clamps of the welding machine spaced apart over the length of the part and located at a certain distance from the part end to be welded, whereupon said clamps are steadily brought together to compass the part longitudinally within elastic limits. Then the second part to be welded is moved forward until it touches the clamped part, said second part is gripped by a third clamp connected to the machine element being stretched, a welding voltage is applied to the parts after which they will be drawn together on account of the stored energy.

The essence of the present invention will become more clear upon considering the description and the drawing enclosed herewith in which the parts to be welded are outlined at various stages of the proposed method according to the present invention.

BRIEF DESCRIPTION OF THE DRAWING

In the drawing,

FIGS. 1 through 6 diagrammatically illustrate six stages which are sequentially gone through in an exemplary embodiment of the method of resistance flash butt welding according to the present invention.

DESCRIPTION OF PREFERRED EMBODIMENT

Prior to welding, one of the parts to be welded (part 1) is secured in two clamps 2 and 3 of a flash butt welding machine over the section with a length of $l_1$, with a third clamp clamp 4 being located at a distance of $l_2$ from clamp 3 (stage 1, FIG. 1).

Next clamps 2 and 3 are brought together by force F compressing part 1 to be welded within the limits of elastic deformation and stretching the welding machine element, arm 5 in particular, coupled to clamps 2 and 3, by values $\Delta a_1$ and $\Delta a_2$ respectively (stage II, FIG. 2).

The above stage results in the accumulation of the elastic energy both in part 1 to be welded and arm 5, in the section limited by clamps 2 and 3.

In addition, the difference $(\Delta a_1 + \Delta a_2) - (l_3 + l_4)$ should provide the adequate amount of elastic energy necessary to create a given value of the upset force $\phi$, which can be determined by Hooke's law. In the above polynomial $l_3$ is a flashing allowance and $l_4$ — upset allowance.

After that the second part 6 to be welded is steadily moved to the clamped part until a reliable abutting contact is established, whereupon the said second part is gripped by the third clamp 4 of the welding machine (stage III, FIG. 3). Subsequently welding current is supplied by welding transformer 7 to the parts to be welded (stage IV, FIG. 4).

Further on, the elastic energy is released during flashing and upsetting due to an increase to the extent of $l_3 + l_4$ in the distance separating the clamps brought together and welding is carried out (stage V, FIG. 5).

As soon as the welding procedure is completed the welded article is removed from the machine (stage VI, FIG. 6).

The elastic energy may be also sorted in both the parts to be welded and in several elements of the welding machine.

The present invention can be summarized as follows:

A method according to the subject matter in which for compressing the part to be welded and stretching the element, e.g., an arm, of a flush butt welding machine in the direction of the upset force prior to welding, one of the parts to be welded is secured in two clamps of the welding machine spaced apart over the length of the part and located at a certain distance from the part end, whereupon the said first two clamps are moved nearer to each other and the second part to be welded is moved to the clamped one unit it touches said part, the second part being gripped by the third clamp coupled to the machine element being expanded; after that a welding current is supplied to the parts by a welding transformer and the parts to be welded are drawn together under the effect of the elastic energy.

What is claimed is:

1. A method of resistance flash welding of two elongated members placed end to end, comprising: clamping at least one of the two elongated members in first and second longitudinally spaced clamps which are rigidly secured to a welding machine element; longitudinally compressing the clamped elongated member in a region between said first and second longitudinally spaced clamps and stretching said welding machine element to store compressive energy in said clamped elongated member in the region between said first and second longitudinally spaced clamps; aligning and securing the other of said two elongated members in end to end relation with said clamped elongated member; passing welding current in said two elongated members in series so as to cause a flash therebetween and releasing the stored compressive energy in said clamped elongated member while welding is performed.

* * * * *